United States Patent Office 3,361,578
Patented Jan. 2, 1968

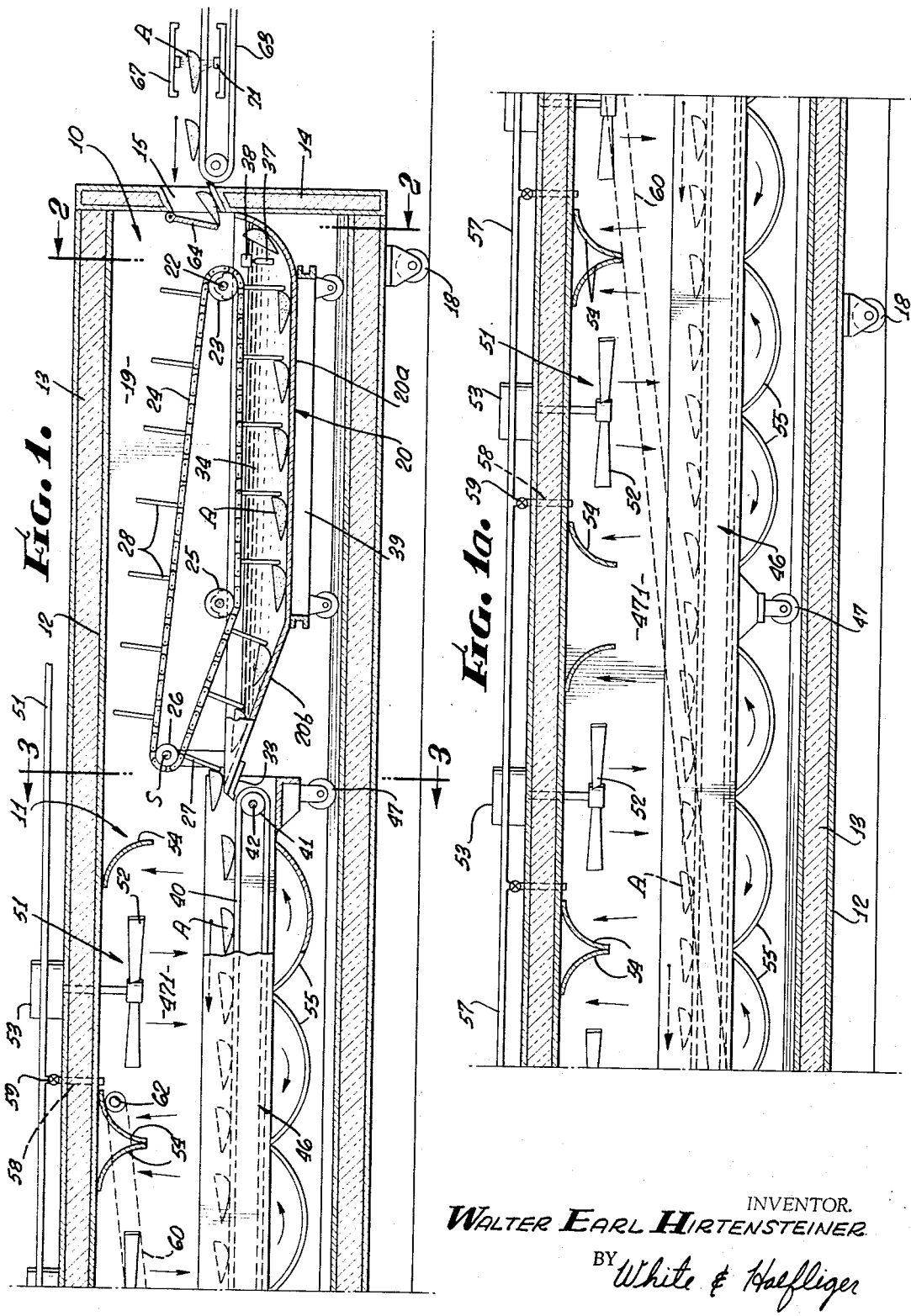

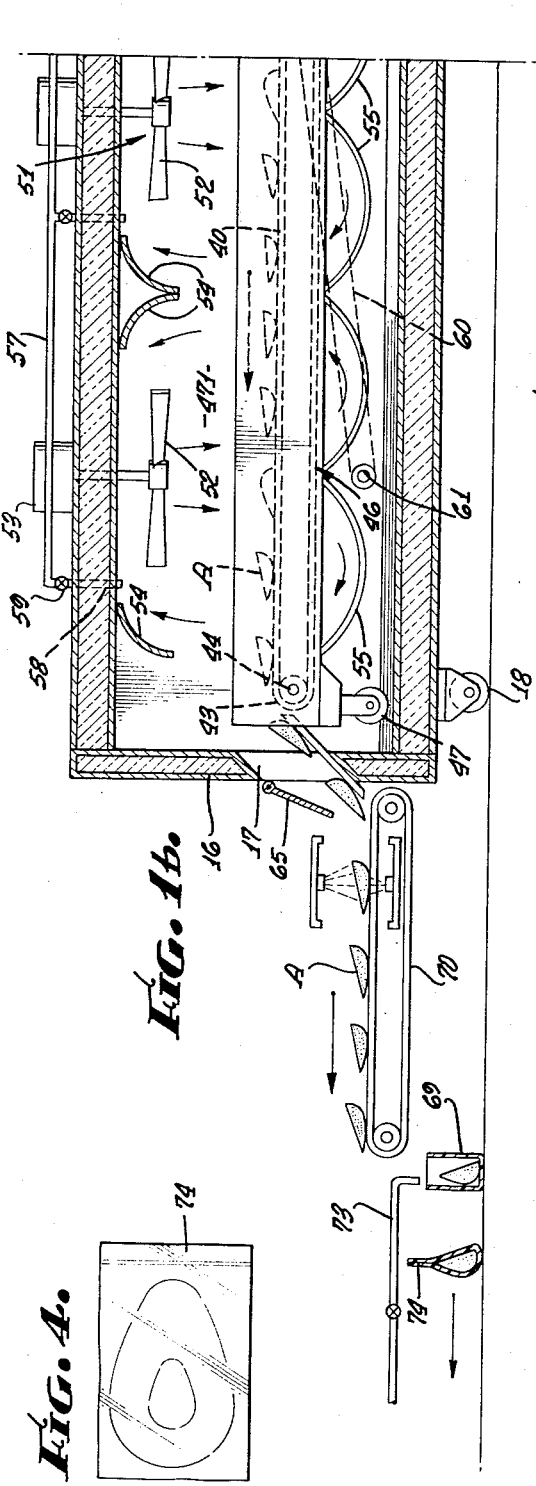
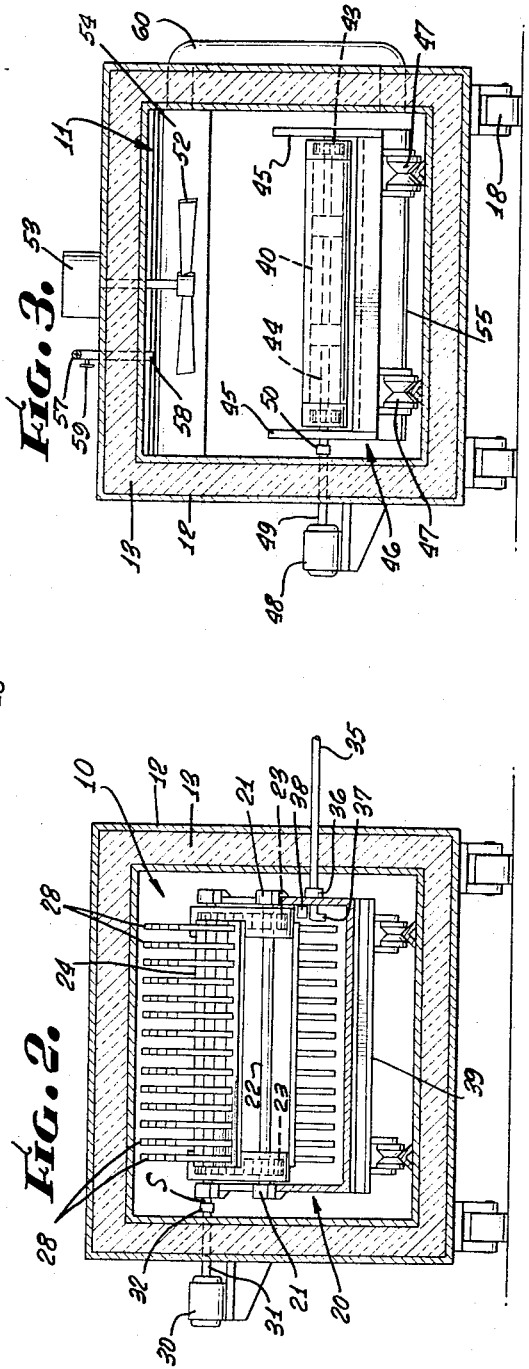

3,361,578
PRESERVATION OF AVOCADOS BY FREEZING
Walter Earl Hirtensteiner, 15051 Eastvale Road,
Poway, Calif. 92064
Filed Mar. 9, 1964, Ser. No. 350,247
10 Claims. (Cl. 99—193)

ABSTRACT OF THE DISCLOSURE

The invention achieves long-sought advances in the preservation of avocados which, because of the peculiarities of this fruit, have generally defied their preservation in a state suitable for commercial distribution, maintenance and edible qualities over extended periods.

---

The invention is predicated upon achieving freeze-preserved avocado by subjecting sectioned fruit to two stage nitrogen freezing under conditions of low temperatures, heat transfer rates and limited time such that the avocado becomes frozen throughout in a manner assuring its preservation, apparently by conversion to and retention of its moisture content in crystals so small as to cause the fruit to retain essentially its normal texture and otherwise desirable qualities.

The method employed is to initially subject the avocado to outer depth freezing by contact with liquid nitrogen, following which the cooling is continued by contact with the evolved nitrogen gas and at necessarily high heat transfer rates maintained by repeated high velocity circulation of the gas against the avocado sections, all in a time sequence and period that create and maintain the non-disruptive form of water crystallization in the fruit. In so doing, the invention efficiently uses the freezing capacity of the gas by continuing its circulation through a temperature rise in excess of 200° F. within a total freezing temperature range.

*Preliminary discussion and description of the invention*

This invention has for its general object to preserve avocado sections by low temperature freezing to a condition permitting indefinite maintenance of the avocado sections in preserved condition under ordinary household or market refrigeration.

Although numerous attempts have been made to provide marketable avocados, or avocado sections, by freezing, insofar as I am aware, none has been successful. By nature, the avocado has presented a difficult problem in attempting its preservation by freezing, because of the highly homogenous texture of the fruit and its tendency to degrade physically, in color and flavor, as a consequence of texture impairment. If undertaken to be frozen by ordinary methods, the consequences would be in the nature of incomplete freezing throughout to the low temperature herein contemplated, and the effects of the freezing, if attempted at very low temperatures, would be to freeze the moisture content of the fruit into ice crystals so large as to impair or disrupt its normal texture, with consequent degradation of the fruit thereafter in the respects noted, even if kept under refrigeration. Such disruptions appear as severe crazing or splitting, and distortion of the fruit out of its normal shape and proportions.

The present invention obviates those limitations previously encountered, by freezing of avocados using liquid and gaseous nitrogen under a combination of conditions involving low temperatures (liquid nitrogen boils at —320° F.), controlled times of exposure to the coolant, and the maintenance of sufficiently high heat transfer rates that it becomes possible to freeze the fruit throughout to temperatures that may range considerably below 0° F. while keeping the ice crystal formation in the fruit so small and so distributed that no appreciable impairment of the fruit texture will occur. As a result I am able to provide marketable avocado sections which retain essentially all the qualities of the fresh fruit.

Generally considered, the invention contemplates contacting avocado sections in a first cooling stage with liquid nitrogen productive of initial rapid cooling of the outer regions of the fruit and during a controlled relatively shorter period but during which the bulk, in excess of 50%, of the sensible heat content of the fruit above its final cooling temperature and condition is removed. The sections then undergo second stage cooling by contact with cold nitrogen gas evolved from the first stage liquid under conditions productive of continued rapid cooling made possible by the maintenance of high velocity gas contact with the fruit which results in desirably high heat exchange rates.

Effects of the first stage cooling has been observed to produce in some avocados rather superficial surface crazing or cracking which may impair the desired normal appearance of the frozen fruit for marketing. A further feature and object of the invention is the elimination of such surface cracking or crazing by aqueous filming of the fruit surfaces before contact with the liquid nitrogen.

Other objects of the invention have to do with further treatment and packaging of the frozen sections to provide for the market packaged single or multiple avocado sections having and capable of retaining the important qualities as to appearance, integrity and flavor of the fresh fruit. Among such objects are to supplement if required the preservative effects of the freezing by applying to the frozen sections a coating or glaze of suitable composition inhibitive of oxidation of the fruit. Various such antioxidants are known and have been used in other produce treatments.

Finally, the invention contemplates avocado sections which have been frozen and prepared as outlined, packaged to retain their preserved condition indefinitely under ordinary refrigeration. To gain added display advantages, I preferably seal the fruit sections in transparent air-impermeable packages from which most of the air has been replaced by inert gas, desirably nitrogen, because of its convenient availability as the freezing coolant.

All the various features and objects of the invention will be understood more fully from the following detailed description of illustrative embodiments shown by the accompanying drawings, in which:

FIGS. 1, 1a and 1b are views continuing leftward in that order, showing the freezing equipment in longitudinal section, together with diagrammatically illustrated appurtenant equipment at the feed and discharge ends;

FIGS. 2 and 3 are cross sections taken respectively on lines 2—2 and 3—3 of FIG. 1; and FIG. 4 illustrates a packaged avocado section.

Generally considered, the freezing equipment may be regarded as comprising a first stage, generally indicated at 10 wherein the avocado sections to be frozen are subjected to initial cooling by contact with liquid coolant, and a second freezing stage generally indicated at 11, wherein the sections undergo continuing cooling and freezing by contact with gas evolved from the first stage liquid and which is circulated in high velocity contact with the produce. Both stages may conveniently be accommodated in a single elongated chamber defined by walls 12 encased within a thermal insulating jacket 13 so composed as to minimize atmospheric heat transfer into the cooling zones. During operation the inlet end of the chamber is closed by a removable insulation closure 14 having an inlet opening 15, and the opposite end of the extended chamber has a similar removable closure 16 containing a discharge opening 17. It may be desirable to adapt the entire cooling chamber structure to be movable or transportable for use at different locations, for which purposes the structure may be suitably mounted on wheels or casters 18.

Referring particularly to the first freezing stage 10, the corresponding chamber extent 19 is shown to contain an elongated open vessel 20 on the sides (FIG. 2) of which are journaled at 21 a shaft 22 keyed to rolls or sprockets 23 which carry an endless reticulated belt 24 passing over idler rolls or sprockets 25 mounted on the sides of the vessel 20, and rolls or sprockets 26 mounted on the vessel-carried supports 27 and driven by shaft S. The belt 24 carries a succession of transverse rows of fingers which function as pushers to advance the avocado sections through the vessel 20. Preferably, the body of the belt 24 is non-metallic and has plastic or resin segments of Nylon, Teflon or the like which obviate expansion and contraction difficulties in a metallic belt on conveyor subjected to the extremely low temperature of the liquid bath. The pusher fingers 28 however may be metallic. Due to the low chamber temperature, shaft S is driven from the outside by motor 30 whose shaft 31 is disconnectably coupled at 32 to the belt drive shaft. As illustrated in FIG. 1, the vessel 20 has at 20a an essentially horizontal extent beyond which the bottom inclines upwardly at 20b to a discharge lip 33 overlying the later described gas cooling chamber conveyor. Any suitable provision may be made for feeding into and maintaining a body 34 of the liquid coolant in vessel 20. Merely as illustrative, the coolant may be introduced through line 35 releasably coupled at 36 to inlet 37 positioned inside the vessel and having associated therewith an appropriate liquid level control diagrammatically indicated at 38. It is desirable that the vessel and conveyor assembly be removable from the chamber 19 for any of such purposes as cleaning, replacement or repair of parts. Accordingly the vessel 20 is shown to be mounted on a wheeled carriage 39 so that upon disconnection of couplings 32 and 36 and removal of the end closure 14, the vessel and conveyor structure may be pulled out of the chamber.

Low temperature gas released from the liquid bath 34 passes forwardly into the atmosphere of the second cooling stage 11 wherein the incompletely frozen avocado sections A advance on an elongated conveyor 40 which may be of any suitable construction and is shown diagrammatically to be carried on sprockets 41 carried by shaft 42, the opposite end of the conveyor belt passing over sprockets 43 driven by shaft 44. Referring to FIG. 3, the conveyor shafts extend between and are supported by the sides 45 of an appropriate frame structure generally denoted at 46 and which may be mounted on wheels 47 to permit removal of the conveyor and later described frame mounted baffles from the second stage chamber 47 after removal of the end closure 16. Shaft 44 is driven from the outside by motor 48 whose shaft 49 is releasably coupled at 50 to the conveyor drive.

Provision is made at successive locations generally indicated at 51 within chamber 471, and of which there may be any suitable number, for circulating the first stage gas effluent in repeated high velocity contact with the avocado sections on the conveyor 40 at the individual stages 51, while maintaining a relatively low net flow of the gas through the chamber. Each of the stages 51 employs a fan or blower of suitable design and conventionally illustrated at 52 driven by motor 53 mounted on top of the chamber structure. The fan displaces the cold gas downwardly against and through the produce on the conveyor. Baffles 54, concave in relation to the fan, extend transversely across the rectangular chamber 47 and serve to direct to the fan the gas return displacement downwardly in the direction of the arrows in FIG. 1a. Directly beneath the fan and baffles 54, the conveyor frame structure 46 mounts a pair of downwardly concave transversely extending baffles 55 which, in accordance with the arrows, direct the fan displacement that has passed through the avocados, outwardly and upwardly and again through the avocados so that the bulk of the chamber gas at any one of the locations 51 undergoes repeated recirculation through and in contact with the produce being frozen. To achieve the objectives of high transfer rates of heat from the produce to the gas, the fans 52 are so designed and given variable operating speeds to maintain the avocado surface contacting velocity of the gas at high rates as in the range of about 1500 to 3000 feet per minute. Thus at each stage 51 there is maximized the cooling potential of the gas by its high velocity retention, and the stage succession is caused to operate at progressively reducing temperature gradient running through the chamber to as practicably high a temperature as may be desired at the outlet 17, say in the order of 0° F. to −100° F., governed by the net gas flow through the chamber. Such flow is controllable in any suitable manner as by the area relation of the inlet 15 to the outlet 17, where the latter is larger and therefore the total gas flow is to the outlet.

Whereas ordinarily, the cooling capacity of the gas evolved from the first stage liquid will suffice to reduce the temperature in chamber 471 of the avocado sections throughout well below 0° F., provision may be made to implement the second stage cooling capacity as by flashing extraneous liquid coolant at one or more locations in the second chamber atmosphere. Thus diagrammatically, liquid normally gaseous coolant supplied through line 57 may be released through outlets 58 under control of valves 59 at one or more locations within chamber 471. Also it may be desirable to provide for recirculation of gas within the chamber, for which purpose I may provide at one or both sides thereof ducts 60 leading from locations at 61 near the outlet end of the chamber to return inlets at 62 toward or near the inlet end of the chamber and in such relation to one of the fans 52 that gas displacement by the latter will induce the return flow through duct 60.

The avocado sections (with seeds removed) to be frozen may be fed on conveyor 63 through inlet 15 which may or may not have a pivoted closure 64 displaceable by the produce. The latter drops into the liquid coolant bath 34 and is advanced therein by the pushers 28 at a rate governed by the length of time required or desired for that initial extent of cooling by direct contact with the liquid coolant at high solid-to-liquid heat transfer rates. Upon advancement out of the bath, the sections A are carried forward on conveyor 40, again at a controlled rate governed by the ultimately desired temperature to which the produce is to be frozen throughout, in relation to the effective gas cooling potential governed in general by the maintained produce-to-gas heat transfer rates, the net gas flow through the chamber and the controlled gas outlet temperature, which typically may be about 0° F. to −50° F. From conveyor 40 the sections are discharged through outlet 17 which may or may not have a displaceable closure 65, onto the conveyor 66 for any desired further treatment to be given the product.

For the freezing of half section avocados, their residence time in the bath may range between about 30 seconds and 50 seconds and between about four minutes and eight minutes in the gas chamber 471. I have successfully used first and second stage residence times respectively of about 37 seconds and six minutes for freezing half sections avocados. Tests indicate that in excess of 50% of the sensible heat in the avocados above their final freezing temperature below 0° F., and typically about −20° F., is removed in the nitrogen bath.

It is found that because of the extremely low temperature (−320° F.) of the liquid bath 34, some sectioned avocados may be subject to surface cracking or crazing during or as a consequence of residence in the bath. While not fully known, it appears that a principal reason for cracking or crazing may be a non-uniformity of heat transference over the surface area of the avocado sections to the liquid coolant. In accordance with the invention, I have discovered a simple and effective way to obviate such impairment by subjecting the sections preliminarily, as while upon the conveyor 63, to an aqueous surface coating or filming, which may be accomplished by dipping, spraying or wetting in any other suitable manner which results in complete surface filming of the sections. As illustrative, I have shown diagrammatically a chamber structure 67 within which the liquid is sprayed downwardly and upwardly against the sections A from nozzles 71. The filming liquid may be water or any of various aqueous solutions as of the later mentioned anti-oxidants. Upon entering the bath 34, the effect of the aqueous surface coating is to present a heat transfer rate equalizing medium or film, which apparently reduces the differential of heat transfer rates that would otherwise occur within different areas of the avocado surfaces (and which apparently are the cause of cracking or crazing) to a degree such that upon leaving the bath and thereafter, the sections remain free from any consequential or objectionable disruptures.

It may be desirable to further treat the frozen sections A shown to be discharged through outlet 17 onto a conveyor 70, for the purpose of preventing or inhibiting oxidation with resultant impairment of color or other qualities. For this purpose the frozen sections may be given a film or glaze coating of any of various anti-oxidants heretofore applied in other or conventional processes to various kinds of fruit or vegetable produce. Typical antioxidants are aqueous solutions of ascorbic (vitamin C) citric acid, sodium sulfite, and also sulphur dioxide. I have found to be particularly effective as an anti-oxidant full strength or somewhat diluted lemon juice, which has been observed to maintain especially cut or sectioned fruit against oxidation degradation.

The invention lends itself to particular advantage in the production of avocado sections for packaging in hermetically sealed packages within which the section or sections will remain preserved indefinitely under ordinary store or domestic refrigeration temperatures. As illustrative of a particularly contemplated packaging, one or more pieces of the frozen sections, with or without anti-oxidant coating, may be placed within packages indicated at 69 to be in the form of transparent air-pearmeable bags or packets made typically of polyethylene, from which air is displaced by an inert gas such as nitrogen jetted through nozzle 73 into the packet. Thereupon the latter is hermetically sealed at 74. The combined effects of freezing of the product throughout, application of the anti-oxidant if used, and exclusion of consequential oxidizing air from the packet, results in a visibly preserved and naturally appearing (FIG. 4) sectioned avocado suitable for general distribution and sale.

The described apparatus, selected as illustrative of equipment suitable for practice of the present process, is the subject matter of my co-pending application Ser. No. 560,358 (a continuation of application Ser. No. 350,249, abandoned), entitled "Food Freezing Apparatus."

I claim:

1. Method of preserving avocado sections, that includes contacting the sections with liquid nitrogen to produce quick surface cooling of the sections with evolution of gas from the liquid at a temperature of about −320° F., and continuing cooling of the sections by contacting them with the evolved gas maintained in high velocity flow against the sections for a period of time resulting in final cooling of the sections throughout to temperatures below 0° F. while the gas absorbs heat from the sections and is elevated to a temperature below 0° F. and above −100° F.

2. The method of claim 1, in which the sections are given an aqueous coating in advance of their contact with the liquid nitrogen to prevent surface crazing of the sections that would otherwise occur.

3. The method of claim 1, in which the sections are contacted with liquid nitrogen by advancement through a bath of the liquid.

4. The method of claim 3, in which the sections are given an aqueous coating in advance of their contact with the bath liquid nitrogen to prevent surface crazing of the sections that would otherwise occur.

5. The method of claim 1, in which most of the sensible heat initially contained in the sections as measured above their final cooling temperatures is removed by transference to the liquid nitrogen.

6. The method of claim 1, in which the sections are fully contacted with the liquid nitrogen for a period of about 30 to 50 seconds and are then contacted with the high velocity gas for a period between about 4 to 8 minutes.

7. The method of claim 1, in which the finally cooled sections are coated with an anti-oxidant.

8. The method of claim 7, in which said anti-oxidant is essentially lemon juice.

9. The method of claim 7, in which the sections are given an aqueous coating in advance of their contact with the liquid nitrogen to prevent surface crazing of the sections that would otherwise occur.

10. An avocado section preserved by freezing throughout to a temperature below 0° F. by the method of claim 1 and characterized by conversion of its moisture content to contained ice crystals so small as to retain in frozen state essentially the normal texture of the avocado during prolonged maintenance at ordinary refrigeration temperatures.

References Cited

UNITED STATES PATENTS

| | | | |
|---|---|---|---|
| 2,385,140 | 9/1945 | Knowles | 62—173 |
| 3,039,276 | 6/1962 | Morrison | 99—193 |
| 3,250,630 | 5/1966 | Webster et al. | 99—193 |
| 3,294,553 | 12/1966 | Benson | 99—193 |

OTHER REFERENCES

Walker, How Nitrogen Protects the Quality of Food Industries, September 1949, pp. 37, 38, 190 and 192.

A. LOUIS MONACELL, *Primary Examiner.*

M. VOET, *Assistant Examiner.*

UNITED STATES PATENT OFFICE
CERTIFICATE OF CORRECTION

Patent No. 3,361,578            January 2, 1968

Walter Earl Hirtensteiner

It is hereby certified that error appears in the above numbered patent requiring correction and that the said Letters Patent should read as corrected below.

Column 1, line 17, beginning with "The invention is" and including "temperature range." in line 37, same column 1, should be included as part of the ABSTRACT OF THE DISCLOSURE.

Signed and sealed this 22nd day of April 1969.

(SEAL)
Attest:

Edward M. Fletcher, Jr.            EDWARD J. BRENNER

Attesting Officer                Commissioner of Patents